(12) United States Patent
Rothschild

(10) Patent No.: US 10,814,661 B2
(45) Date of Patent: Oct. 27, 2020

(54) METHOD AND SYSTEM FOR VERIFYING AUTHENTICITY OF A DOCUMENT

(71) Applicant: Leigh M. Rothschild, Miami, FL (US)

(72) Inventor: Leigh M. Rothschild, Miami, FL (US)

( * ) Notice: Subject to any disclaimer, the term of this patent is extended or adjusted under 35 U.S.C. 154(b) by 253 days.

(21) Appl. No.: 15/833,204

(22) Filed: Dec. 6, 2017

(65) Prior Publication Data
US 2018/0154676 A1 Jun. 7, 2018

Related U.S. Application Data

(60) Provisional application No. 62/430,954, filed on Dec. 7, 2016.

(51) Int. Cl.
| | |
|---|---|
| *G06K 9/00* | (2006.01) |
| *B42D 25/305* | (2014.01) |
| *G06K 9/18* | (2006.01) |
| *G06F 16/583* | (2019.01) |
| *G07D 7/00* | (2016.01) |
| *G07D 7/2033* | (2016.01) |
| *G07D 7/0043* | (2016.01) |
| *B42D 25/28* | (2014.01) |
| *G06K 19/10* | (2006.01) |
| *G06K 19/06* | (2006.01) |
| *G06Q 30/00* | (2012.01) |
| *G06F 16/955* | (2019.01) |

(52) U.S. Cl.
CPC ......... *B42D 25/305* (2014.10); *G06F 16/583* (2019.01); *G06K 9/00154* (2013.01); *G06K 9/00161* (2013.01); *G06K 9/00483* (2013.01); *G06K 9/18* (2013.01); *G07D 7/0032* (2017.05); *G07D 7/0043* (2017.05); *G07D 7/2033* (2013.01); *B42D 25/28* (2014.10); *G06F 16/9554* (2019.01); *G06K 19/06028* (2013.01); *G06K 19/06037* (2013.01); *G06K 19/10* (2013.01); *G06Q 30/0185* (2013.01)

(58) Field of Classification Search
CPC .................................................. B42D 25/305
USPC ........................................................ 382/119
See application file for complete search history.

(56) References Cited

U.S. PATENT DOCUMENTS

| | | | |
|---|---|---|---|
| 10,452,908 B1* | 10/2019 | Ramanathan | G06K 9/00899 |
| 2002/0076111 A1* | 6/2002 | Dance | G06K 9/6828 382/229 |
| 2007/0214365 A1* | 9/2007 | Cornett | G06Q 50/18 713/183 |

(Continued)

*Primary Examiner* — Stephen P Coleman

(57) ABSTRACT

A system and a method for verifying authenticity of a physical copy and a digital copy of a document are disclosed. The method comprises registering a document in a repository by storing details related to the document in a location of the repository. A symbology for the document is generated. The symbology is an identifier of the location of the repository comprising the document. The symbology is associated with either a physical or a digital copy of the document. The digital copy of the document is printed to generate a printed copy. The printed copy or the physical copy of the document is scanned to generate a scanned image. The document and the details related to the document present at the location of the repository are accessed. The scanned image is compared with the document stored in the repository to determine the authenticity of either the physical copy or the digital copy of the document.

32 Claims, 4 Drawing Sheets

(56) References Cited

U.S. PATENT DOCUMENTS

| | | | | |
|---|---|---|---|---|
| 2012/0304260 A1* | 11/2012 | Steeves | ................... | G06F 21/31 |
| | | | | 726/5 |
| 2016/0125231 A1* | 5/2016 | Stoyanov | ........... | G06K 9/00288 |
| | | | | 382/116 |
| 2017/0228804 A1* | 8/2017 | Soni | ................... | G06Q 30/0601 |
| 2017/0344709 A1* | 11/2017 | Dey | ...................... | G06F 19/328 |

* cited by examiner

METHOD AND SYSTEM FOR VERIFYING AUTHENTICITY OF A DOCUMENT

FIELD OF THE DISCLOSURE

The present disclosure is generally related to data validity discovery and more particularly to validity of digital and physical data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

In many a situations, a document may need to be provided to a user, by an author. The document may be hand written or may be present in a digital format. The document, when used by the user for any purpose, may need to be authenticated before being processed.

For an example, a medical prescription is an important document. In most of the countries, the medical prescriptions are handwritten by a doctor. Such medical prescriptions could be tampered to obtain unlawful access to certain category of medicines. There are a certain medicines that are identified as controlled substances or prescription only medicines. Such medicines are mandatory for not being sold without genuine medical prescriptions. The said requirements are set for avoiding any unethical use of these medicines.

In order to avoid the wrongful use, the medical prescriptions must be verified, at any dispensary, before selling medications to a patient. The medical prescription may need to be verified for preventing any medical fraud.

Apart from medical prescriptions, several other documents require validation before their processing. Such categories of documents may include a legal instrument, an educational certificate, a bank letter, an official letter, a government document, bills for goods and services, and several others.

Thus, there lies an immense need for a system and a method for verifying genuineness of a document, before the document is processed further.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method of verifying authenticity of a physical copy of a document is provided. The method may comprise registering a document in a repository by storing details related to the document in a location of the repository. The details may comprise at least one of a name of the document, an e-mail of a creator of the document, date and time of creation of the document, and an image of the document comprising content of the document, and a signature of the creator. The method may further comprise generating a symbology for the document. The symbology may be an identifier of the location of the repository, comprising the document. The method may further comprise associating the symbology with a physical copy of the document. The method may further comprise scanning the physical copy of the document to generate a scanned image. The method may further comprise accessing the document and the details related to the document present at the location of the repository. The document may be accessed using the symbology present on the scanned image. The method may further comprise comparing the scanned image with the document stored in the repository to determine the authenticity of the physical copy of the document, based on results of the comparison.

In an example embodiment, a method of verifying authenticity of a digital copy of a document is provided. The method may comprise registering a document in a repository by storing details related to the document in a location of the repository. The details may comprise at least one of a name of the document, an e-mail of a creator of the document, date and time of creation of the document, and an image of the document comprising content of the document, and a signature of the creator. The method may further comprise generating a symbology for the document. The symbology may be an identifier of the location of the repository, comprising the document. The method may further comprise associating the symbology with a physical copy of the document. The method may further comprise printing the digital copy of the document to generate a printed copy. The method may further comprise scanning the physical copy of the document to generate a scanned image. The method may further comprise accessing the document and the details related to the document present at the location of the repository. The document may be accessed using the symbology present on the scanned image. The method may further comprise comparing the scanned image with the document stored in the repository to determine the authenticity of the physical copy of the document, based on results of the comparison.

In an example embodiment, a system for verifying authenticity of a physical copy of a document is provided. The system may register a document in a repository by storing details related to the document in a location of the repository. The details may comprise at least one of a name of the document, an e-mail of a creator of the document, date and time of creation of the document, and an image of the document comprising content of the document, and a signature of the creator. The system may generate a symbology for the document. The symbology may be an identifier of the location of the repository, comprising the document. The system may associate the symbology with a physical copy of the document. The system may scan the physical copy of the document to generate a scanned image. The system may access the document and the details related to the document present at the location of the repository. The document may be accessed using the symbology present on the scanned image. The system may compare the scanned image with the document stored in the repository to determine the authenticity of the physical copy of the document, based on results of the comparison.

In an example embodiment, a system for verifying authenticity of a digital copy of a document is provided. The system may register a document in a repository by storing details related to the document in a location of the repository. The details may comprise at least one of a name of the document, an e-mail of a creator of the document, date and time of creation of the document, and an image of the document comprising content of the document, and a signature of the creator. The system may generate a symbology for the document. The symbology may be an identifier of the location of the repository, comprising the document. The system may associate the symbology with a physical copy of the document. The system may print the digital copy of the document to generate a printed copy. The system may scan the physical copy of the document to generate a scanned image. The system may access the document and the details related to the document present at the location of the repository. The document may be accessed using the symbology present on the scanned image. The system may compare the scanned image with the document stored in the repository to determine the authenticity of the physical copy of the document, based on results of the comparison.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
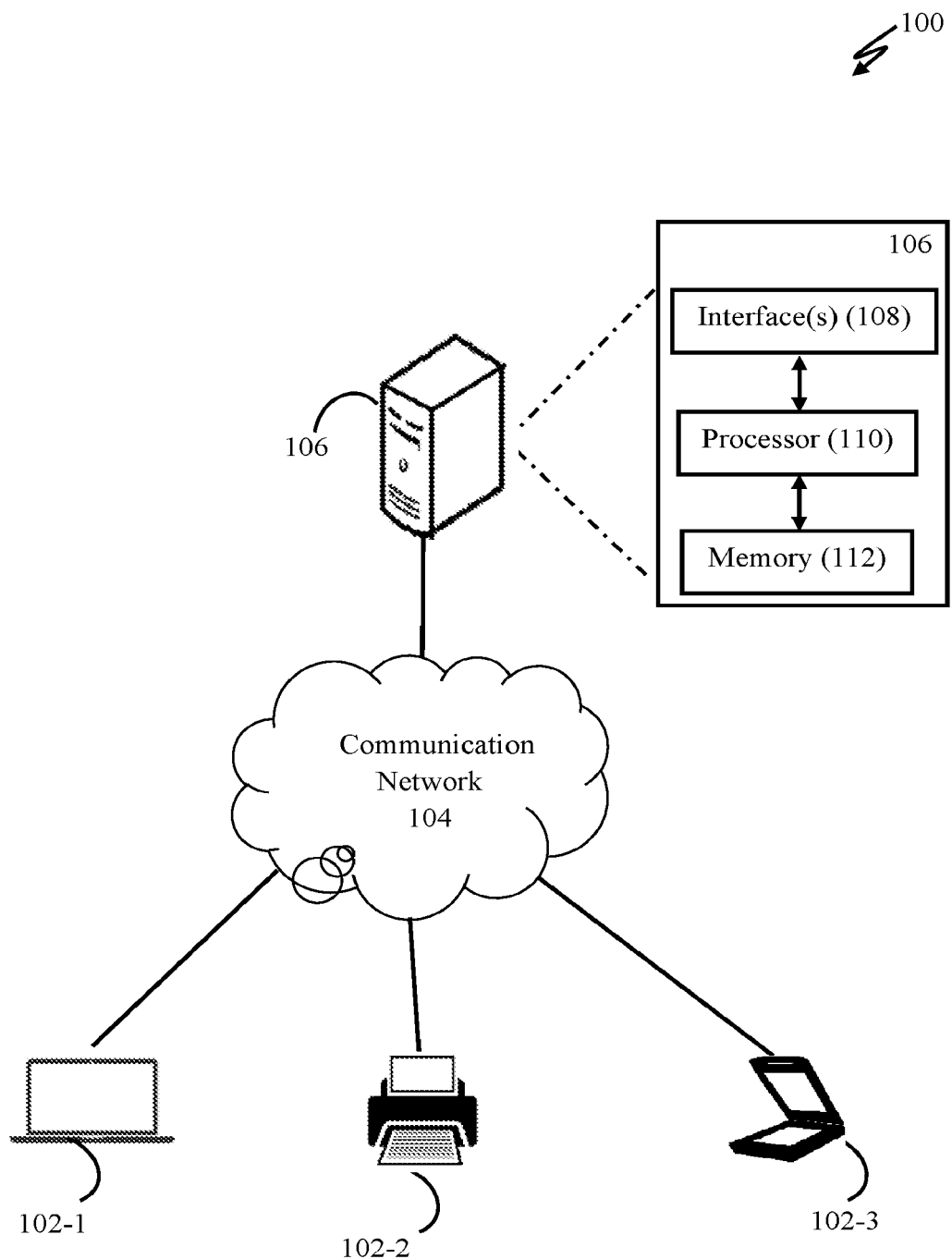
FIG. 1 illustrates a network connection diagram 100 of a system for verifying authenticity of a document, according to an embodiment.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

A server 106 may be implemented as a local hardware or a remote hardware. The server may be present as a single processing system or a group of systems programmed for providing at least one service. The server 106 may be using Database Management Services (DBMS) such as Oracle™, Microsoft™ Structured Query Language (SQL), and others. The server 106 may comprise an interface(s) 108, a processor (110), and a memory 112.

The processor 110 may execute computer program instructions stored in the memory 112. The processor 110 may also be configured to decode and execute any instructions received from one or more other electronic devices or one or more servers. The processor 110 may include one or more general purpose processors (e.g., INTEL microprocessors) and/or one or more special purpose processors (e.g., digital signal processors or Xilinx System On Chip (SOC) Field Programmable Gate Array (FPGA) processor). The processor 110 may be configured to execute one or more computer-readable program instructions, such as program instructions to carry out any of the functions described in this description.

The memory 112 may include, but is not limited to, fixed (hard) drives, magnetic tape, floppy diskettes, optical disks, compact disc read-only memories (CD-ROMs), and magneto•optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions.

The interface(s) 108 may be used to communicate with a user. The interface(s) 108 may be used either to accept an input from the user or provide an output to the user, or perform to both actions. The interface(s) 108 may either be a Command Line Interface (CLI) or a Graphical User Interface (GUI).

The communication network 104 may be implemented using at least one communication technique selected from Visible Light Communication (VLC), Worldwide Interoperability for Microwave Access (WiMAX), Long term evolution (LTE), Wireless local area network (WLAN), Infrared (IR) communication, Public Switched Telephone Network (PSTN), Integrated Services Digital Network (ISDN), Broadband, Optical Fibre network, and Radio waves.

FIG. 1 illustrates a network connection diagram 100 of a system for verifying authenticity of a document, according to an embodiment. FIG. 1 comprises a laptop 102-1, a printer 102-2, and a scanner 102-3 connected to a system for verifying the authenticity of the document. The system may be connected through the communication network 104. The system may be implemented as the server 106, as illustrated in the FIG. 1.

In one embodiment, a person may need to provide a handwritten document to a user. The person may subsequently be referred as a creator, of the document. At first, the creator may register the document, using a user device. In one case, the user device may be the laptop 102-1. However, other user devices such as a desktop, tablet, phablet, and a smart phone may also be used. In one case, the creator may need to be registered on the server 106, in order to register the document on the server 106. The creator may be registered using at least one of a phone number, e-mail address, name and a login password. A geographical location of the creator may also be determined to store a current location of the creator.

Post registration, the creator may be authenticated on the server 106 by one of a phone call, e-mail, and a text or audio message. In one case, the creator may be asked for a code provided to him either through the phone call, e-mail, text or audio message. The creator may also be authenticated at multiple stages. For example, the creator may be asked to provide both the code and the login password for his user identity. In one case, the creator may also be verified by matching his location of presence and the stored location. Such registration and authentication of the creator may help in avoiding registration of any false document on the server 106.

In one embodiment, the document may be registered under the creator's account, maintained on the server 106. The server 106 may either be present locally or remotely. In any case, the server 106 may be accessed through the communication network 104. The creator may store the document in a location of a repository, present on the server 106. Further, details related to the document may also be stored in the repository. The details may comprise a title of the document, creator's e-mail address, date and time of creation of the document, and an image of the document comprising content of the document, and the creator's signature. A timestamp may be stored to capture the date and time of creation, of the document.

Post registration of the document, a symbology may be generated for the document. The symbology may be generated by the server 106. The symbology may be either of an alphanumeric code, Quick Response (QR) code, barcode, and a hologram. Further, multiple symbology may also be generated for the document.

In one embodiment, the symbology may be an identifier of the location of the repository, comprising the document. The identifier may be a Uniform Resource Locator (URL) or a document number. For an example, the URL may be "docsave.com/A106324." Here, "docsave.com" may be an address of the server 106 comprising the repository. "A106324" refers to the location of the repository, comprising the document.

In one embodiment, a QR code may be generated for the document. The QR code may be associated with a physical copy of the document. In one case, the QR code may be printed on the physical copy of the document, by the printer 102-2. The physical copy of the document may then be used by the user.

In one embodiment, the user may provide the physical copy of the document to a second user. The second user may need to check for authenticity of the document. The second user may scan the physical copy of the document to generate a scanned image, using the scanner 102-3. Further, the scanning may be performed using any other device using a Charge Coupled Device (CCD) or a Complementary Metal Oxide Semiconductor (CMOS) sensor. The scanned image may be present in a suitable image format like Joint Photographic Experts Group (JPEG), Exchangeable image file format (Exif), Tagged Image File Format (TIFF), Raw Image Format (RAW), Graphics Interchange Format (GIF), Bitmap format (BMP), and Portable Network Graphics (PNG).

In one embodiment, the scanned image may comprise the QR code. The document and the details related to the document, present at the location of the repository, may be accessed using the QR code present in the scanned image.

Successively, the scanned image may be compared with the document stored in the repository. The comparison may be made to determine the authenticity of the document. In one case, the scanned image and the document stored in the repository may be compared using a technique selected from a group consisting of a pixel to pixel comparison, Optical Character Recognition (OCR), keypoint matching, and a histogram method. Further, other recognition and comparison algorithms known in the art may also be used. In one case, a signature present in the scanned image may also be compared with the signature present in the document, stored in the repository. A size and a color of ink and signature characteristics of the signature may be compared. Thus, authenticity of the document may be determined based on results of the comparison.

In one embodiment, the document may be present as a digital copy. The user may have received the document, on a user device, over the communication network, through e-mail or any other communication service and communication technique. In such case, the symbology (QR code) may be associated with the digital copy of the document. The digital copy of the document may be printed, to generate a printed copy. The printed copy of the document may be scanned to generate the scanned image. Successively, the location of the repository may be accessed using the symbology (QR code) present in the scanned image and the scanned image may be compared with the document stored in the repository, to conclude authenticity of the document.

The above described method may be used for several applications where a written document or a digital document may need to be verified for its authenticity. As an example, further explanation is provided for determining authenticity of a medical prescription.

In one embodiment, a doctor may write a medical prescription for a patient. At first, the doctor may register the prescription, using a user device. In one case, the user device may be the laptop 102-1. However, other user devices such as a desktop, tablet, phablet, and a smart phone may also be used. The doctor may register the prescription under his account, maintained on the server 106. The server 106 may either be present locally or remotely. In any case, the server 106 may be accessed through the communication network 104. The doctor may store the prescription in a location of a repository, present on the server 106. In the repository, the doctor may further store details related to the prescription. The details may comprise a title of the prescription, doctor's e-mail address, date and time of creation of the prescription, and an image of the prescription comprising content of the prescription, and the doctor's signature.

Post registration of the prescription, a symbology may be generated for the prescription. The symbology may be generated by the server 106. The symbology may be either of an alphanumeric code, Quick Response (QR) code, barcode, and a hologram. Further, multiple symbology may also be generated for the prescription.

In one embodiment, the symbology may be an identifier of the location of the repository, comprising the prescription. The identifier may be a Uniform Resource Locator (URL) or a prescription number. For an example, the URL may be "docsave.com/A106324." Here, "docsave.com" may be an address of the server 106 comprising the repository. "A106324" refers to the location of the repository, comprising the prescription.

Figure 2:
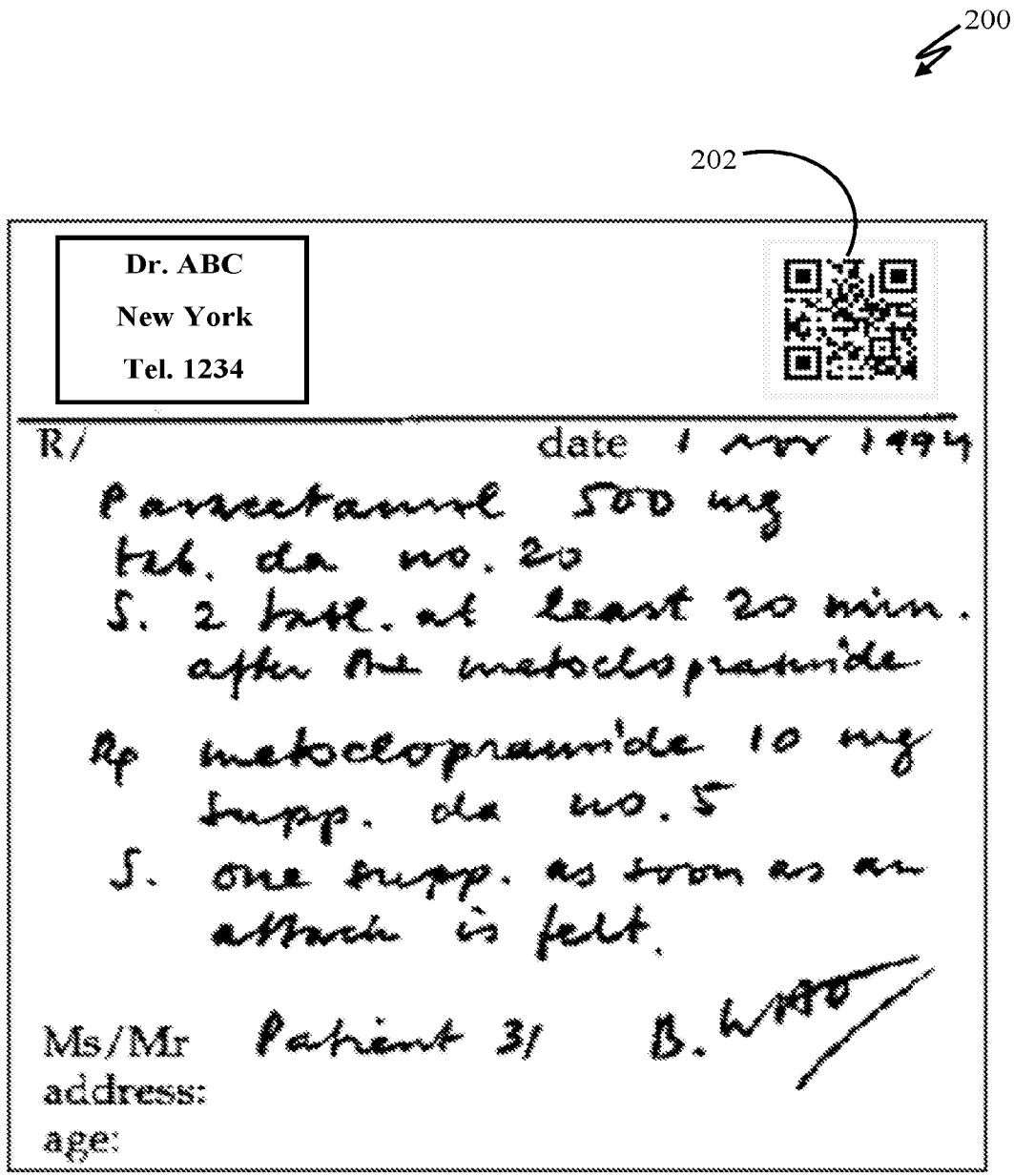
FIG. 2 illustrates a sample medical prescription 200, used as a document, according to an embodiment.

In one embodiment, a QR code may be generated for the prescription. The QR code may be associated with a physical copy of the prescription. In one case, the QR code may be printed on the physical copy of the prescription, by the printer 102-2. FIG. 2 illustrates a sample medical prescription 200, used as the document. The QR code 202 is shown as the symbology associated with the prescription. The physical copy of the prescription may then be used by the patient for buying medicines.

In one embodiment, the patient may provide the physical copy of the prescription to a pharmacist, at a dispensary. The pharmacist may scan the physical copy of the prescription to generate a scanned image, using the scanner 102-3. Further, the scanning may be performed using any other device using a Charge Coupled Device (CCD) or a Complementary Metal Oxide Semiconductor (CMOS) sensor. The scanned image may be present in a suitable image format like Joint Photographic Experts Group (JPEG), Exchangeable image file format (Exit), Tagged Image File Format (TIFF), Raw Image Format (RAW), Graphics Interchange Format (GIF), Bitmap format (BMP), and Portable Network Graphics (PNG).

In one embodiment, the scanned image may comprise the QR code. The prescription and the details related to the prescription, present at the location of the repository, may be accessed using the QR code present in the scanned image.

Successively, the scanned image may be compared with the prescription stored in the repository. The comparison may be made to determine the authenticity of the prescription. In one case, the scanned image and the prescription stored in the repository may be compared using a technique selected from a group consisting of a pixel to pixel comparison, Optical Character Recognition (OCR), keypoint matching, and a histogram method. Further, other recognition and comparison algorithms known in the art may also be used. In one case, a signature present in the scanned image may also be compared with the signature present in the prescription, stored in the repository. A size and a color of ink and signature characteristics of the signature may be compared. Thus, authenticity of the prescription may be determined based on results of the comparison.

In one embodiment, the prescription may be present as a digital copy. The patient may have received the document, on the user device, over the communication network, through e-mail or any other communication service and communication technique. In such case, the symbology (QR code) may be associated with the digital copy of the prescription. The digital copy of the prescription may be printed, to generate a printed copy. The printed copy of the prescription may be scanned to generate the scanned image. Successively, the location of the repository may be accessed using the symbology (QR code) present in the scanned image and the scanned image may be compared with the prescription stored in the repository, to conclude authenticity of the prescription.

The above described methodology may provide benefits comprising but not limited to storage of a valid copy of the document, attaching a unique symbology and identifier with each document, and accurate authentication of the document.

However, the above explanation is provided with respect to a medical prescription, authenticity of other documents may also be determined using the above explained method. For an example, the above explained method may also be used for determining authenticity of an agreement or a legal contract, a legal advice, bill for a commodity, bill for a service, and other document used for diverse applications.

Figure 3:
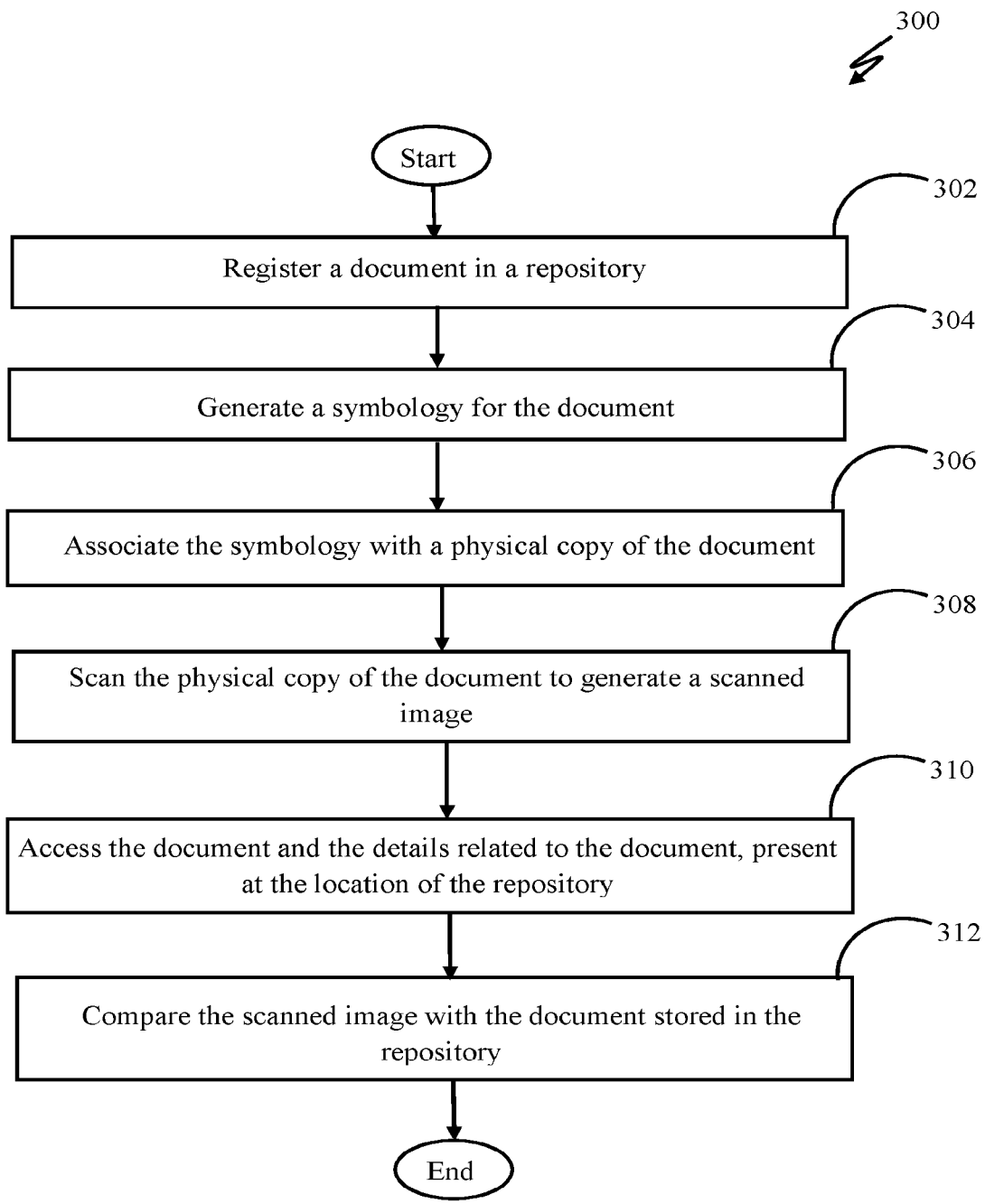
FIG. 3 illustrates a flowchart 300 of a method of verifying authenticity of a physical copy of a document, according to an embodiment.

FIG. 3 illustrates a flowchart 300 of a method of verifying authenticity of a physical copy of a document, according to an embodiment. FIG. 3 comprises a flowchart 300 that is explained in conjunction with the elements disclosed in FIG. 1.

The flowchart 300 of FIG. 3 shows the architecture, functionality, and operation for verifying authenticity of a physical copy of a document. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 3 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 300 starts at the step 302 and proceeds to step 312.

At step 302, a document may be registered in a repository. The document may be registered by storing details related to the document in a location of the repository. The details may comprise at least one of a name of the document, an e-mail of a creator of the document, date and time of creation of the document, and an image of the document comprising content of the document, and a signature of the creator. In one embodiment, the document may be registered in the repository by the processor 110.

At step 304, a symbology may be generated for the document. The symbology may be an identifier of the location of the repository, comprising the document. In one embodiment, the symbology may be generated by the processor 110.

At step 306, the symbology may be associated with a physical copy of the document. In one embodiment, the symbology may be associated, with a physical copy of the document, by the processor 110.

At step 308, the physical copy of the document may be scanned to generate a scanned image. In one embodiment, the physical copy of the document may be scanned by the processor 110.

At step 310, the document and the details related to the document, present at the location of the repository, may be accessed. The document may be accessed using the symbology present on the scanned image. In one embodiment, the document and the details related to the document may be accessed by the processor 110.

At step 312, the scanned image may be compared with the document stored in the repository to determine the authenticity of the physical copy of the document, based on results of the comparison. In one embodiment, the scanned image may be compared with the document stored in the repository by the processor 110.

Figure 4:
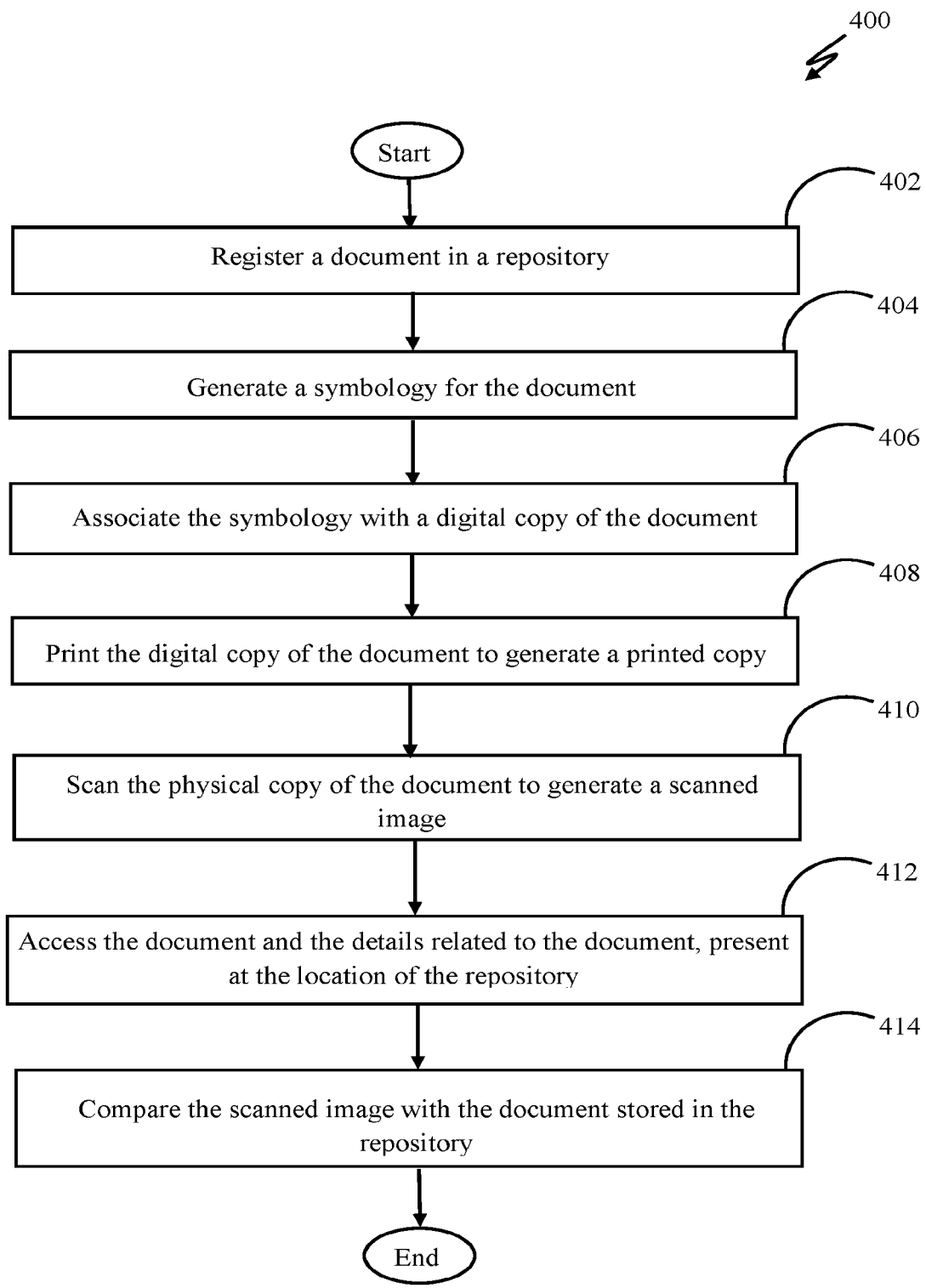
FIG. 4 illustrates a flowchart 400 of a method of verifying authenticity of a digital copy of a document, according to an embodiment.

FIG. 4 illustrates a flowchart 400 of a method of verifying authenticity of a digital copy of a document, according to an embodiment. FIG. 4 comprises a flowchart 400 that is explained in conjunction with the elements disclosed in FIG. 1.

The flowchart 400 of FIG. 4 shows the architecture, functionality, and operation for verifying authenticity of a digital copy of a document. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 500 starts at the step 402 and proceeds to step 414.

At step 402, a document may be registered in a repository by storing details related to the document in a location of the repository. The details may comprise at least one of a name of the document, an e-mail of a creator of the document, date and time of creation of the document, and an image of the document comprising content of the document, and a signature of the creator. In one embodiment, the document may be registered in the repository by the processor 110.

At step 404, a symbology may be generated for the document. The symbology may be an identifier of the location of the repository, comprising the document. In one embodiment, the symbology may be generated by the processor 110.

At step 406, the symbology may be associated with a digital copy of the document. In one embodiment, the symbology may be associated by the processor 110.

At step 408, the digital copy of the document may be printed to generate a printed copy. In one embodiment, the digital copy of the document may be printed by the processor 110.

At step 410, the printed copy of the document may be scanned to generate a scanned image. In one embodiment, the printed copy of the document may be scanned by the processor 110.

At step 412, the document and the details related to the document present at the location of the repository may be accessed. The document may be accessed using the symbology present on the scanned image. In one embodiment, the document and the details related to the document may be accessed by the processor 110.

At step 414, the scanned image may be compared with the document stored in the repository to determine the authenticity of the digital copy of the document, based on results of the comparison. In one embodiment, the scanned image may be compared with the document stored in the repository by the processor 110.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto•optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine•readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method of verifying authenticity of a physical copy of a document, the method comprising: registering, by a processor, a document in a repository by storing details related to the document in a location of the repository, wherein the details comprise at least one of a name of the document, an e-mail of a creator of the document, date and time of creation of the document, and an image of the document comprising content of the document, and a signature of the creator; generating, by the processor, a symbology for the document, wherein the symbology is an identifier of the location of the repository, comprising the document; associating, by the processor, the symbology with a physical copy of the document; scanning, by the processor, the physical copy of the document to generate a scanned image; accessing, by the processor, the document and the details related to the document present at the location of the repository, wherein the document is accessed using the symbology present on the scanned image; and comparing, by the processor, the scanned image with the document stored in the repository to determine the authenticity of the physical copy of the document, based on results of the comparison.

2. The method of claim 1, wherein the symbology is at least one of an alphanumeric code, Quick Response (QR) code, barcode, and a hologram.

3. The method of claim 1, wherein the identifier is at least one of a Uniform Resource Locator (URL) and a document number.

4. The method of claim 1, wherein the scanned image and the document are compared using a technique selected from a group consisting of a pixel to pixel comparison, Optical Character Recognition (OCR), keypoint matching, and a histogram method.

5. The method of claim 1, further comprising comparing a signature present in the scanned image with the signature present in the document stored in the repository, wherein a size and a color of ink and signature characteristics of the signature are compared.

6. The method of claim 1, wherein the document is a medical prescription.

7. The method of claim 1, further comprising registering and authenticating the creator of the document for allowing the creator to register the document in the repository.

8. The method of claim 7, wherein the creator is registered and authenticated based on a current location of the creator.

9. A method of verifying authenticity of a digital copy of a document, the method comprising; registering, by a processor, a document in a repository by storing details related to the document in a location of the repository, wherein the details comprise at least one of a name of the document, an e-mail of a creator of the document, date and time of creation of the document, and an image of the document comprising content of the document, and a signature of the creator; generating, by the processor, a symbology for the document, wherein the symbology is an identifier of the location of the repository, comprising the document; associating, by the processor, the symbology with a digital copy of the document; printing, by the processor, the digital copy of the document to generate a printed copy; scanning, by the processor, the printed copy of the document to generate a scanned image; accessing, by the processor, the document and the details related to the document present at the location of the repository, wherein the document is accessed using the symbology present on the scanned image; and comparing, by the processor, the scanned image with the document stored in the repository to determine the authenticity of the digital copy of the document, based on results of the comparison.

10. The method of claim 9, wherein the symbology is at least one of an alphanumeric code, Quick Response (QR) code, barcode, and a hologram.

11. The method of claim 9, wherein the identifier is at least one of a Uniform Resource Locator (URL) and a document number.

12. The method of claim 9, wherein the scanned image and the document are compared using a technique selected from a group consisting of a pixel to pixel comparison, Optical Character Recognition (OCR), keypoint matching, and a histogram method.

13. The method of claim 9, further comprising comparing a signature present in the scanned image with the signature present in the document stored in the repository, wherein a size and a color of ink and signature characteristics of the signature are compared.

14. The method of claim 9, wherein the document is a medical prescription.

15. The method of claim 9, further comprising registering and authenticating the creator of the document for allowing the creator to register the document in the repository.

16. The method of claim 15, wherein the creator is registered and authenticated based on a current location of the creator.

17. The A system for verifying authenticity of a physical copy of a document, the system comprising:
a processor; and
a memory coupled to the processor, wherein the processor is capable of executing programmed instructions stored in the memory to:
register a document in a repository by storing details related to the document in a location of the repository, wherein the details comprise at least one of a name of the document, an e-mail of a creator of the document, date and time of creation of the document, and an image of the document comprising content of the document, and a signature of the creator;
generate a symbology for the document, wherein the symbology is an identifier of the location of the repository, comprising the document;
associate the symbology with a physical copy of the document;
scan the physical copy of the document to generate a scanned image;
access the document and the details related to the document present at the location of the repository, wherein the document is accessed using the symbology present on the scanned image; and
compare the scanned image with the document stored in the repository to determine the authenticity of the physical copy of the document, based on results of the comparison.

18. The system of claim 17, wherein the symbology is at least one of an alphanumeric code, Quick Response (QR) code, barcode, and a hologram.

19. The system of claim 17, wherein the identifier is at least one of a Uniform Resource Locator (URL) and a document number.

20. The system of claim 17, wherein the scanned image and the document are compared using a technique selected from a group consisting of a pixel to pixel comparison, Optical Character Recognition (OCR), keypoint matching, and a histogram method.

21. The system of claim 17, further comprising comparing a signature present in the scanned image with the signature present in the document stored in the repository, wherein a size and a color of ink and signature characteristics of the signature are compared.

22. The system of claim 17, wherein the document is a medical prescription.

23. The system of claim 17, further comprising registering and authenticating the creator of the document for allowing the creator to register the document in the repository.

24. The system of claim 23, wherein the creator is registered and authenticated based on a current location of the creator.

25. A system for verifying authenticity of a digital copy of a document, the system comprising:
a processor; and
a memory coupled to the processor, wherein the processor is capable of executing programmed instructions stored in the memory to:
register a document in a repository by storing details related to the document in a location of the repository, wherein the details comprise at least one of a name of the document, an e-mail of a creator of the document, date and time of creation of the document, and an image of the document comprising content of the document, and a signature of the creator;
generate a symbology for the document, wherein the symbology is an identifier of the location of the repository, comprising the document;
associate the symbology with a digital copy of the document; print the digital copy of the document to generate a printed copy; scan the printed copy of the document to generate a scanned image;
access the document and the details related to the document present at the location of the repository, wherein the document is accessed using the symbology present on the scanned image; and
compare the scanned image with the document stored in the repository to determine the authenticity of the digital copy of the document, based on results of the comparison.

26. The system of claim 25, wherein the symbology is at least one of an alphanumeric code, Quick Response (QR) code, barcode, and a hologram.

27. The system of claim 25, wherein the identifier is at least one of a Uniform Resource Locator (URL) and a document number.

28. The system of claim 25, wherein the scanned image and the document are compared using a technique selected from a group consisting of a pixel to pixel comparison, Optical Character Recognition (OCR), keypoint matching, and a histogram method.

29. The system of claim 25, further comprising comparing a signature present in the scanned image with the signature present in the document stored in the repository, wherein a size and a color of ink and signature characteristics of the signature are compared.

30. The system of claim 25, wherein the document is a medical prescription.

31. The system of claim 25, further comprising registering and authenticating the creator of the document for allowing the creator to register the document in the repository.

32. The system of claim 31, wherein the creator is registered and authenticated based on a current location of the creator.

* * * * *